United States Patent [19]

Crocker

[11] 3,853,774

[45] Dec. 10, 1974

[54] PROCESS FOR PREPARING OIL-SOLUBLE BASIC MAGNESIUM SALTS

[75] Inventor: Richard E. Crocker, Novato, Calif.

[73] Assignee: Chevron Research Company, San Francisco, Calif.

[22] Filed: Dec. 20, 1972

[21] Appl. No.: 316,939

[52] U.S. Cl.................... 252/33.4, 252/18, 252/25, 252/33
[51] Int. Cl.............................................. C10m 1/40
[58] Field of Search ................. 252/18, 25, 33, 33.4

[56] References Cited
UNITED STATES PATENTS

| | | | |
|---|---|---|---|
| 3,312,618 | 4/1967 | Lesuer et al. | 252/33 |
| 3,629,109 | 12/1971 | Gergel et al. | 252/33 |

*Primary Examiner*—Patrick P. Garvin
*Assistant Examiner*—Andrew H. Metz
*Attorney, Agent, or Firm*—G. F. Magdeburger; C. J. Tonkin; B. G. Fehringer

[57] ABSTRACT

A process is provided for preparing oil-soluble basic magnesium salts comprising contacting at least one acidic material with a mixture comprising
1. at least one oil-soluble sulfonic acid,
2. a stoichiometric excess of basically reacting magnesium oxide,
3. water,
4. at least one lower aliphatic alcohol,
5. naphthenic acids, and
6. at least one substantially inert organic liquid diluent, until the reaction between the acidic material and the mixture substantially ceases.

12 Claims, No Drawings

3,853,774

PROCESS FOR PREPARING OIL-SOLUBLE BASIC MAGNESIUM SALTS

BACKGROUND OF THE INVENTION

Field of the Invention

The present invention relates to a process for preparing oil-soluble basic magnesium salts and to their use in lubricating oil compositions.

2. Description of the Prior Art

A process for preparing overbased alkaline earth sulfonates by carbonating an oil mixture of neutral alkaline earth sulfonate, alkaline earth oxide, and alkanol is described in U.S. Pat. No. 3,524,818 to Sabol et al., issued Aug. 18, 1970. The improvement in this process is the formation and maintenance of a catalytic amount of ammonium carbamate in the mixture during the carbonation thereof. The carbamate is formed by the introduction of ammonia into the reaction system. Alkaline earth oxides useful in the disclosed process are calcium, strontium and barium oxides.

A similar process directed to use of magnesium oxide is disclosed in Watson et al., U.S. Pat. No. 3,492,230, issued Jan. 27, 1970. In this process an amine promoter, such as ethylene diamine, is used in place of the ammonium carbamate.

A process in which the magnesium incorporated into the composition is obtained from magnesium metal rather than magnesium oxide is disclosed in Carlyle et al., U.S. Pat. No. 2,895,913, issued July 21, 1959. In this process the magnesium metal is reacted with a lower alkanol. The magnesium alkoxide is then reacted with carbon dioxide to form a magnesium alkoxide-carbon dioxide complex. This complex is then added to a lubricating oil composition containing an oil-soluble dispersing agent, such as a sulfonate.

Another process for preparing oil-soluble basic magnesium salts is disclosed in Gergel, U.S. Pat. No. 3,629,109, issued Dec. 21, 1971. In this process oil-soluble basic magnesium salts are prepared by contacting a mixture of an oil-soluble organic acid, magnesium oxide, water, at least one lower aliphatic alcohol, and a substantially inert organic liquid diluent with carbon dioxide until the reaction ceases, substantially removing all the free lower aliphatic alcohol, and continuing the addition of the carbon dioxide until the liquid phase of the mixture becomes substantially clear and filterable.

In another embodiment of this reference, a mixture of 1 equivalent of oil-soluble sulfonic acid and 1 to 20 equivalents of oil-soluble hydroxy-substituted aromatic carboxylic acids are substituted for the oil-soluble organic acids. This embodiment does not require the removal of the lower aliphatic alcohol and the second carbonation step. However, it does require the use of the more exotic and expensive oil-soluble hydroxy-substituted aromatic carboxylic acids, such as a hydrocarbyl-substituted salicylic acid.

As described in Watson et al, supra, the preparation of basic magnesium sulfonates has been particularly difficult because of the long reaction times, the poor metal utilization, and difficulties in filtration. Some of these problems can be overcome by using metallic magnesium, as in Carlyle et al., supra. However, the difference in price between metallic magnesium and magnesium oxide makes the utilization of magnesium oxide a much more economically attractive route to the preparation of basic magnesium sulfonates.

A primary difficulty in the use of the magnesium oxide has been achieving acceptable metal utilization levels. This leads to basic magnesium sulfonates not having desirably high metal ratios and alkalinity values. Attempts have been made, as shown in the above prior art, to use various promoters such as ammonia, amines and water-alcohol systems to achieve this result. However, such attempts have not always been successful. Filtration problems have persisted along with low metal utilization and low alkalinity values. Since basic magnesium sulfonates exhibit several highly desirable properties useful in lubricating oils, there has been a continuing need for a method of preparing these compounds which is both economical and easy to carry out.

SUMMARY OF THE INVENTION

It has now been found that basic magnesium salts can be readily prepared using magnesium oxide as the source of magnesium by a process comprising contacting at least one acidic material with a mixture comprising 1. at least one oil-soluble sulfonic acid or equivalent derivatives thereof susceptible to overbasing;
2. a stoichiometric excess of basically reacting magnesium oxide;
3. water;
4. at least one lower aliphatic alcohol;
5. naphthenic acids having an average molecular weight from about 150 to about 600; and
6. at least one substantially inert organic liquid diluent;

until the reaction between the acidic material and the mixture substantially ceases.

In this process the naphthenic acids act as a promoter. Naphthenic acids greatly increase the metal utilization, thereby providing compositions having higher alkalinity values. In addition, the products obtained are easily filterable to yield clear, bright compositions.

DETAILED DESCRIPTION OF THE INVENTION

The process of the invention for preparing oil-soluble basic magnesium salts comprises contacting, at a temperature from about 10°C. to about the decomposition temperature of the reaction mixture, at least one acidic material with a mixture comprising 1. at least one oil-soluble sulfonic acid or equivalent derivatives thereof susceptible to overbasing;
2. a stoichiometric excess, based on the total equivalents of acid and equivalent derivatives thereof in (1), of basically reacting magnesium oxides;
3. water in an amount from about 0.5 mols to about 10 mols per mol of the magnesium oxide;
4. at least one lower aliphatic alcohol in an amount from about 0.1 mol to about 10 mols per mol of water;
5. naphthenic acids having an average molecular weight from about 150 to about 600 in an amount from about 0.1 equivalents to about 5.0 equivalents per equivalent of the sulfonic acid and equivalent derivatives thereof; and
6. at least one substantially inert organic liquid diluent comprising from about 25 percent to about 80 percent by weight of the mixture;

until reaction between the acidic material and the mixture substantially ceases.

The Acidic Material

The acidic materials which can be used in the process of the present invention include inorganic acids, usually the gaseous acid anhydrides and acidic gases such as $B_2O_3$, $CO_2$, $H_2S$, $SO_2$, HCl, $NO_2$, $PCl_3$, $ClO_2$, $SOCl_2$, $BF_3$, $CS_2$, COS, etc. Lower aliphatic carboxylic acids can also be used, e.g., oxalic, acetic, propionic acids and the like. Formic acid is the preferred carboxylic acid. However, the inorganic acidic gases, particularly $CO_2$, $SO_2$ and $H_2S$ are particularly preferred. Carbon dioxide is the most preferred inorganic acidic material due to overall considerations of cost, ease of use, availability and performance of the resulting product.

The Oil-Soluble Sulfonic Acid

The reaction mixture contains at least one oil-soluble sulfonic acid or equivalent derivatives thereof susceptible to over-basing. By "susceptible to overbasing" is meant those which can be converted to basic magnesium salts according to the present invention. These include known sulfonic acids which have been or are presently used in preparing basic alkaline earth metal salts and constitute an art recognized class of acids. These organic acids are generally oil-soluble acids, but oil-insoluble organic acids can be used in the present process provided the basic magnesium salts prepared therefrom according to the procedures of the present invention are soluble in oils at a concentration at which the salts impart desirable properties. Thus, in the present invention, organic acids can be considered oil-soluble if they, or their normal or basic metal salts, are oil-soluble.

Suitable oil-soluble sulfonic acids can be represented by the general formulae:

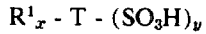

I.

II.

wherein

1. T is a cyclic nucleus of the mono- or poly-nuclear type, including benzoid or heterocyclic nuclei, such as benzene, naphthalene, anthracene, 1,2,3,4-tetrahydronaphthalene, thianthrene, and the like. Usually T will represent an aromatic hydrocarbon nucleus, especially a benzene or naphthalene nucleus.

2. $R^1$ is a hydrocarbon or essentially hydrocarbon radical usually containing at least four aliphatic carbon atoms and usually not more than 500 carbon atoms.

3. $y$ and $z$ represent an integer of from 1 to about 4.

4. $x$ is at least 1 with the proviso that the substituents represented by the Group $R^1$ are such that the acids are oil-soluble. In general, this means that the groups represented by $R^1$ should contain at least about eight aliphatic carbon atoms per sulfonic acid molecule, and preferably at least about 12 aliphatic carbon atoms. Generally $x$ will be an integer of from 1 to 3.

5. $R^2$ represents an aliphatic or aliphatic-substituted cycloaliphatic hydrocarbon or essentially hydrocarbon radical. $R^2$ represents an aliphatic radical, it generally contains at least 15 to 18 carbon atoms. Where $R^2$ represents an aliphatic-substituted cycloaliphatic group, the aliphatic substituent generally contains a total of at least about 12 carbon atoms.

Exemplary of aliphatic groups represented by $R^2$ are alkyl and alkenyl. Alkyl radicals such as pentadecyl, octadecyl, eicosyl, docosyl, hexacosyl, octacosyl, tetracontyl, pentacontyl, octacontyl, eicosenyl, docosenyl, hexacosenyl, octacosenyl, tetracontenyl, polypropoxy propylene and the like.

Exemplary of aliphatic-substituted cycloaliphatic radicals represented by $R^2$ are cetyl cyclohexyl, lauryl cyclohexyl, cetyl oxyethyl cyclohexyl, octadecenyl cyclohexyl, octadecenyl cyclopentyl, and the like. The groups T, $R^1$ and $R^2$ in Formulae I and II can also contain other substituents such as hydroxy, mercapto, halogen, nitro, amino, nitroso, carboxy, lower carboalkoxy and the like, as long as the essentially hydrocarbon character of the groups is not destroyed.

The sulfonic acids can be derived from naturally occurring sources, such as petroleum, or can be obtained by chemical synthesis. Illustrative of sulfonic acids are mahogany sulfonic acids, petroleum sulfonic acids, mono and poly wax-substituted naphthalene sulfonic acids, cetyl chlorobenzene sulfonic acids, cetyl phenol sulfonic acids, cetyl phenol disulfide sulfonic acids, paraffin wax sulfonic acids, alpha olefin sulfonic acids, and the like.

A preferred class of sulfonic acids are the petroleum sulfonic acids, a well-known class of sulfonic acids derived from petroleum products according to conventional means, such as sulfuric acid or sulfuric acid anhydride treatment of petroleum.

Processes for the preparation of sulfonic acids are disclosed in U.S. Pat. Nos. 2,480,638; 2,483,800; 2,717,265; 2,726,261; 2,794,829; 2,832,801; 3,225,086; 3,337,613; 3,351,655; and the like. Sulfonic acids falling within Formulae I and II above are discussed in U.S. Pat. Nos. 2,616,904; 2,616,905; 2,723,234; 2,723,235; 2,723,236; 2,777,874; and other U.S. Pat. referred to in each of these patents. The oil-soluble sulfonic acids, representing a class of compounds well known in the art, require no further discussion herein.

The equivalent derivatives of the oil-soluble sulfonic acids include the alkali and alkaline earth metal salts of the acids, such as the lithium, sodium, potassium, magnesium, calcium, and barium salts. The alkali metal salts are generally obtained by the neutralization of the sulfonic acids. For example, the sodium salts can be obtained by caustic neutralization of the reaction product obtained by sulfuric acid treatment of petroleum. The alkaline earth metal salts can be obtained by direct neutralization or by metathesis from the alkali metal salts. In the practice of the invention, the use of the salts, particularly the sodium, calcium and magnesium salts of the oil-soluble sulfonic acids is preferred to the use of the free acids.

Magnesium Oxide

The magnesium oxide used in the process of this invention is a basically reacting magnesium oxide. Magnesium oxide is commercially available in two forms, the so-called "light" or "active" form and a relatively inactive form known as "deadburned" or "heavy" magnesium oxide. Active magnesium oxide is available in a wide range of relative degrees of activity. For purposes of this invention, any magnesium oxide which enters into the reaction is suitable. In general, the more active the magnesium oxide, the more costly it is. Thus, for purposes of economy, the least active form of magnesium oxide which gives economic metal utilization and yields a product of the desired alkalinity value is suitable for use in the process. The particular magnesium oxide which represents the best compromise between cost and product properties can be readily determined by running a screening series of reactions testing the magnesium oxides under consideration. Magnesium oxides, such as Michigan 30 and Michigan 1782 available from Michigan Chemical Company, were found to result in very good metal utilization in the process. Low cost magnesium oxides such as Michigan 3, from Michigan Chemical Company, Dow L-2 available from Dow Chemical Company, and Merck Maglite K available from Merck Chemical Company, result in satisfactory metal utilization and also represent an excellent economic compromise. A particularly good choice in terms of cost, activity, and metal utilization is Michigan 3. Other magnesium oxides suitable for use include Morton Elastomag 20, Elastomag 100, Elastomag 170 and Dow Synthetic Magnesite, calcined.

It is obvious that the cheaper the magnesium oxide, the more economical will be the products obtained from practicing the process of the invention if good metal utilization is experienced. In general, however, the less expensive magnesium oxides are also less active and herein lies the advantage of the process of the invention. By incorporating naphthenic acids, as described herein below, into the reaction mixture, less active grades of magnesium oxide can be used to obtain fully satisfactory basic magnesium salts, thereby representing considerable economic advantage over the prior art methods.

The magnesium oxide is present in the reaction mixture in at least a stoichiometric excess, based on the total equivalents of the oil-soluble sulfonic acids and equivalent derivatives thereof. In other words, at least one equivalent of magnesium oxide is present in the reaction mixture for each equivalent of sulfonic acid and equivalent derivatives thereof. Generally, if the amount of magnesium oxide present is very little greater than the stoichiometric excess, the alkalinity value of the product obtained will be very low. If it is desirable to produce products with high alkalinity values, the quantity of magnesium oxide used will be many times that of the equivalents of sulfonic acid and equivalent derivatives thereof present in the reaction mixture. The quantity of magnesium oxide required to produce highly basic magnesium salts will generally range from about 5 to about 30 equivalents of magnesium oxide per equivalent of sulfonic acid or derivatives thereof. Preferably, about 10 to 25 equivalents of the magnesium oxide are present per equivalent of sulfonic acid and derivatives thereof.

Water

Water is present in the reaction mixture to aid in the incorporation of the acidic material. The quantity of water present can vary widely. In general, however, water will be present in an amount ranging from about 0.5 mols to about 10 mols per mol of magnesium oxide. Preferably, about 1 to 2 mols of water is present per mol of magnesium oxide.

The Alcohol

The reaction mixture contains at least one lower aliphatic alcohol. Suitably the alcohols contain from one to about six carbon atoms, such as methanol, ethanol, propanol, isopropanol, butanol, isobutanol, pentanol, hexanol, and the like. Preferably, the lower aliphatic alcohol contains from one to four carbon atoms. In terms of economics as well as ease of removal from the reaction mixture, methanol is a preferred alcohol.

The alcohol is generally present in from about 0.1 mol to about 10 mols of alcohol per mol of water. Preferably, about 0.2 to 2 mols of alcohol per mol of water is used.

Naphthenic Acids

Naphthenic acids are present in the reaction mixture to promote the incorporation of the acidic material. These acids are a well known class of compounds derived from petroleum straight run distillates, generally kerosene and gas oil. Caustic soda scrubbing of these materials followed by acidification of the resulting sodium naphthenate solution yeilds the acids. Acidification is generally accomplished with sulfuric acid. The supernatant crude naphthenic acids are obtained by decantation and may be purified by distillation, if desired. In addition, naphtha washing of the sodium naphthenate solution can be performed to decrease the hydrocarbon oil content of the finished acids.

Naphthenic acids are a mixture of compounds. They include cycloalkyl carboxylic acids substituted with one or more predominantly hydrocarbyl substituents. The cycloakyl groups usually contain five or six carbon atoms. Each cycloaliphatic ring is substituted with one or more carboxylic acid groups. The only restriction on the hydrocarbyl substituents on the cycloaliphatic ring is that they contain a sufficient number of carbon atoms to make the naphthenic acids oil soluble. This will generally range from about four to about 40 carbon atoms.

Naphthenic acids also include cycloalkyl substituted aliphatic acids. The cycloalkyl group and the aliphatic group are such that the total molecule is oil soluble. The carbon atom content of the cycloalkyl and aliphatic moieties will generally be about the same as for the hydrocarbyl substituted cycloalkyl carboxylic acids.

Naphthenic acids also include noncyclic aliphatic acids. In these, the aliphatic moiety contains sufficient carbon atoms to make the molecule oil soluble. In general, they will contain at least 11 carbon atoms and more usually 15 carbon atoms up to about 40 carbon atoms.

In general, the naphthenic acids suitable for use in the process of the invention have an average molecular weight of from about 150 to about 600. The choice of the particular naphthenic acids to be used usually will be governed by the availability and price of the acids. Generally the least expensive acids within the above range are preferred.

The naphthenic acids are present in the reaction mixture in from about 0.1 equivalents to about 5.0 equivalents per equivalent of the sulfonic acid and equivalent derivatives thereof. Preferably, the naphthenic acids are present in from about 0.1 equivalents to about 3.0 equivalents per equivalent of the sulfonic acid and equivalent derivatives thereof. Most preferably, the naphthenic acid is present in from about 0.2 to about 0.75 equivalents per equivalent of sulfonic acid and derivatives thereof.

The Diluent

In addition to the materials mentioned above, the reaction mixture contains one substantially inert organic liquid diluent in an amount necessary to yield a fluid stirrable reaction mixture. In general, this amount will range from about 25 percent to about 80 percent by weight of the reaction mixture.

The diluent can be any substantially inert organic liquid, such as benzene, toluene, xylene, hexane, heptane, kerosene, petroleum thinners, octane, and the like. A preferred diluent is an oil derived from petroleum, particularly the oils of lubricating viscosity. Most conveniently, the diluent is the oil from which the sulfonic acids were derived if the sulfonic acids are petroleum sulfonic acids. Petroleum sulfonic acids are prepared by sulfonating petroleum oils followed by neutralization of the reaction product. The petroleum sulfonate dissolved in the remaining petroleum can be used in this form, thus supplying both the oil-soluble sulfonic acid or derivatives thereof and the liquid diluent. If necessary, additional diluents such as additional lubricating oil or other inert liquids can be added as needed.

When the process of the invention is used to prepare concentrated oil-soluble basic magnesium salts for compounding lubricating oils, it is generally desirable to keep the amount of diluent to a minumum. Alternatively, a supplemental diluent such as a hydrocarbon thinner, which is easily distilled from the reaction mixture, can be used to provide the necessary fluidity and stirrability. Upon completion of the reaction, the low boiling diluent can then be removed by distillation, generally under vacuum, to yield the concentrated product.

Reaction Conditions

In general, the process of the invention can be carried out at any temperature at which the reaction proceeds satisfactorily to completion. Suitable temperatures range from about 10°C. up to the decomposition temperature of the reaction mixture. Preferably, the process is carried out at a temperature of between 10° and about 100°C. The lower temperatures lead to more easily filterable products in some cases.

Generally, the reaction of the acidic material with the reaction mixture is an exothermic reaction. Accordingly, large reaction masses may require external cooling throughout the reaction period, especially if the reaction is conducted in a well-insulated reaction vessel. It is only necessary to insure against the temperature of the reaction mass rising to or near the decomposition point.

The acidic material is added to the reaction mixture in any convenient form. Generally, the acidic materials are liquid or gaseous. The liquid materials can be added as liquids and the gaseous materials can be introduced into the reaction vessel under pressure and taken up in the reaction mixture through absorption from the reaction vessel atmosphere.

Addition of the acidic material is continued until uptake of the acidic material substantially ceases. As will be appreciated, the reaction time will vary widely with the materials being used, the temperature, agitation, pressure (if the acidic material is a gas), etc. In general, with carbon dioxide approximately 80 percent of the total carbon dioxide used is consumed in about ½ hour with the reaction going substantially to completion in approximately one hour to yield a product having an alkalinity value of about 300. With products having an alkalinity of approximately 400, total reaction time typically is about 90 minutes with 80 to 90 percent of the carbon dioxide having been consumed in the first hour.

The above discussion has assumed that the entire amount of magnesium oxide and naphthenic acids were added to the reaction mixture prior to the introduction of the acidic material into the reaction mixture. However, the magnesium oxide and naphthenic acids can be added continuously or in small increments throughout most of the acidic material addition. It is only necessary to take care when adding the magnesium oxide and naphthenic acid throughout the acidic material addition that the ratio of magnesium oxide to naphthenic acid remains approximately the same throughout this extended addition period as they would have been had they been added in their entirety prior to addition of the acidity material.

After the addition of the acidic material is completed, the reaction mixture is heated to remove the alcohol and part of the water. Subsequent to alcohol removal, the mixture is cooled to 90°–95°C. and water, 5 to 10 percent based on the amount of oil-soluble sulfonic acid and equivalent derivatives originally present in the reaction mixture, is added. While this water addition is not necessary, it appears to reduce the sediment level slightly in the finished product. The reaction mixture is then agitated, followed by heating to approximately 115°C. to remove the water.

After water removal, the mixture is then filtered conveniently by mixing with a filter acid to remove the unincorporated magnesium oxide.

If a low-boiling liquid diluent was included in the reaction mixture, the filtrate is then heated to the boiling point of the diluent for removal thereof. The finished material can then be used as desired. Generally it is compounded with additional oils of lubricating viscosity to provide lubricating oils having a high reserve alkalinity.

LUBRICATING OIL COMPOSITIONS

The lubricating oil compositions of this invention comprise a major amount of an oil of lubricating viscosity and a detergent amount of a composition prepared according to the process of the invention.

The Lubricating Oils

The lubricating oils which find use in this invention are oils of lubricating viscosity derived from petroleum or synthetic sources. The oils can be paraffinic, naphthenic, halo-substituted hydrocarbons, synthetic esters, or combinations thereof. Oils of lubricating viscosity normally have viscosities in the range of 35 to 50,000 Saybolt Universal Seconds (SUS) at 100°F., and more usually from about 50 to 10,000 SUS at 100°F.

The amount of the composition prepared according to the process of the invention necessary to provide detergency in an internal combustion engine varies widely with the particular composition used as well as the use to which the lubricating oil composition is put.

In general, the lubricating oil compositions will contain from about 2 millimoles of magnesium per kilogram of oil up to about 30 percent weight of the oil-soluble basic magnesium salts prepared according to the invention. More usually, the lubricating oil compositions of the invention will contain from about 20 to 50 millimoles of magnesium derived from the oil-soluble basic magnesium salts per kilogram of oil.

The lubricating oil compositions of the invention are useful for lubricating internal combustion engines. The lubricating oils not only lubricate the engines but, because of their detergency properties, help maintain a high degree of cleanliness of the lubricated parts. In addition, the basic magnesium salts act as an alkalinity reserve to neutralize acidic combustion products coming into contact with the lubricating parts.

The oil-soluble basic magnesium salts prepared by the process of the invention are characterized by metal content in excess of that which would be present according to the stoichiometry of the metal cation and the particular oil-soluble sulfonic acid or equivalent derivatives thereof which make up the salt. For example, an oil-soluble monosulfonic acid, when neutralized with a Group II basic metal compound, e.g., a magnesium compound, will produce a normal sulfonate containing one equivalent of magnesium for each equivalent of acid. In other words, the normal metal sulfonate will contain 1 mol of magnesium for each 2 mols of the monosulfonic acid.

By the process of this invention, "basic" complexes of the sulfonic acids are obtained. These basic materials can contain amounts of metal many times in excess of that required to neutralize the acid. These stoichiometric excesses can vary considerably, e.g., from about 0.1 to about 30 or more equivalents, depending upon the reactants, the process conditions, etc.

The degree of basicity of the complexes can be expressed several ways. one method is to describe the "metal ratio." This method describes the ratio of the total chemical equivalents of metal in the product to the chemical equivalents of the compounds said to be made basic, based on the known chemical reactivity and stoichiometry of the two reactants. Thus, in a normal (neutral) magnesium sulfonate, the metal ratio is 1 and in a basic sulfonate the metal ratio can range from about 1.1 to 30 or more, generally from about 5 to about 25.

Another method of expressing the degree of basicity is to describe the "base ratio." This method describes the ratio of chemical equivalents of basic metal to the chemical equivalents of neutral metal. The neutral metal is the metal which would be expected to react to neutralize the sulfonate. The basic metal is the metal in excess of the neutral metal, i.e., it is the metal available to neutralize acidic combustion products. Thus, a normal (neutral) magnesium sulfate has a base ratio of zero (0) and a basic sulfonate can have a metal ratio ranging from about 0.1 up to about 30 or more, generally from about 4 to about 24.

Another method of specifying the degree of basicity of sulfonates is by stating the alkalinity value (AV) of the composition. The method for determining the alkalinity value of a basic composition is set forth in ASTM Method D—2896. Briefly, the alkalinity value is stated as the number of milligrams of potassium hydroxide per gram of composition to which the basic composition is equal. For example, if the composition is basic to the extent that it has the same acid neutralizing capacity per gram as 10 mg of potassium hydroxide, the composition is given an alkalinity value of 10. Alkalinity values can range up to about 600. Of course, the lower limit is 0 for a neutral sulfonate with values of 10 to 50 being common for slightly basic sulfonates. Highly basic sulfonates have values ranging fromm about 275 to about 450.

The following examples are included by way of illustration and not by way of limitation. Unless otherwise indicated, all parts are parts by weight. The examples will be provided separately.

Example 1

This example demonstrates the preparation of a magnesium sulfonate from a sodium sulfonate by metathesis.

The sodium sulfonate was prepared from a synthetic heavy alkylate having an average molecular weight of 390. Synthetic heavy alkylates are obtained as a by-product from the preparation of hard detergent alkylates ($C_{12}$-$C_{15}$ benzenes prepared by alkylating benzene with propylene tetramer and pentamer in the presence of hydrofluoric acid). During the alkylation step some fragmentation of the alkyl polymer occurs yielding light, hard benzenes ($C_4$-$C_6$ monosubstituted benzenes). These light materials are alkylated a second time with a $C_{18}$–$C_{20}$ straight chain cracked wax olefin to yield the synthetic heavy alkylates. The sodium sulfonate is then obtained by sulfonating the alkylate with 26 percent sulfuric acid and neutralizing the resulting sulfonic acid with sodium hydroxide.

To a reaction vessel was added 10 parts of a solution containing naphtha, butyl alcohol and sodium sulfonate in oil. The solution contained 0.56 percent weight sodium as sulfonate. To this was added 20 parts of magnesium chloride hexahydrate dissolved in 45 parts of water. The mixture was stirred at 82°C. for one hour and allowed to stand for one hour with no agitation after which the bottom aqueous layer was withdrawn and discarded. The same procedure was followed twice more using 12.5 parts magnesium chloride hexahydrate, dissolved in 40 parts of water. The oil solution was twice agitated with 110 parts of water for 30 minutes and the aqueous layers withdrawn and discarded. Following the second water wash the reacted contents were heated to 165°C. at 1 lb. per square inch absolute pressure to remove water, alcohol and naphtha. The material remaining in the reactor (110 parts) had a magnesium as sulfonate content of 1.12 percent weight.

By a similar procedure a product containing a similar amount of magnesium sulfonate was obtained from a sodium sulfonate derived from sulfonating a solvent refined neutral oil having a viscosity of 480 SUS at 100°F. Sulfonation was accomplished with 26 percent sulfuric acid and neutralization of the resulting sulfonic acid was accomplished with sodium hydroxide.

Example 2

By the following procedure a number of basic magnesium salts were prepared.

Into a three neck 1-liter flask were placed neutral magnesium sulfonate, magnesium oxide, naphthenic acid, methanol, thinner, and water. The neutral magnesium sulfonate was obtained by following the procedure set forth in Example 1. It was prepared from a 50—50 mixture of synthetic heavy alkylate sulfonate and 480 SUS neutral oil sulfonate. The magnesium oxide was obtained from Michigan Chemical Company under the name of Michigan 3. The naphthenic acids were obtained from Chevron Chemical Company. They are derived from fractions of Gulf Coast Crude and contain 76% naphthenic acids and have an oil-free equivalent weight of about 254. The thinner is available from Chevron Chemical Company as Chevron 265 Thinner.

The above materials are added to the 1-liter flask, as indicated in Table II. The flask contents are agitated and heated to the initial reaction temperature indicated in the Table. Carbon dioxide was then sparged into the flask contents until no further absorption was observed. In general, a temperature increase of 20 to 30°C. is observed under non-isothermal reaction conditions. Total uptake of carbon dioxide is indicated in Table II. After carbon dioxide addition, the flask is heated to about 115°C. to remove water and some thinner. The flask contents are then filtered through filter aid and the filtrate distilled to a final temperature of 210°C. to remove thinner.

In Table II, Runs A through E show the effect of naphthenic acid concentration. Run F used xylene rather than thinner. Run G used a neutral calcium sulfonate, which is a mixture of sulfonates from a neutral solvent refined 480 SUS oil and the synthetic heavy alkylate sulfonate having an average molecular weight of 390, described above. Run H demonstrates low initial reaction temperatures. Run I shows an isothermal reaction.

In Runs A through E a nearly constant volume of reactants was maintained throughout this series by substituting a solvent-refined neutral paraffinic oil having a viscosity of 126 SUS at 100°F. for that part of the naphthenic acids less than 30 parts. As can be seen from this series of runs, the presence of as little as 0.03 equivalents of naphthenic acid per equivalent of sodium sulfonate greatly improves the final alkalinity value and base ratio of the base magnesium salts obtained.

Run G demonstrates that the cation of the sulfonic acid need not be magnesium.

38°C. with agitation. The agitation rate was then increased and carbon dioxide was introduced through a tube with an outlet below the liquid surface. A vent line was led from the reactor condenser system to a water bubbler in order to monitor the carbon dioxide outflow. The carbon dioxide addition rate was adjusted so that a slow bubbling rate of approximately one bubble per five seconds was noted in the bubbler. Total carbonation time was two hours with the maximum temperature of 62°C. being reached after 75 minutes. Carbon dioxide addition averaged 10 g. per mintue during the first 30 minutes, 14 g. per minute during the second 30 minutes, 7 g. per minute during the next 30 minutes, and 1 g. per minute during the last 30 minutes. During the last 45 minutes of the reaction, the vent line was closed and the reactor was pressurized to 5 lbs. per square inch gauge with carbon dioxide in order to maximize the carbon dioxide absorption. A total of 990 g. was used from the carbon dioxide storage. Not all of this carbon dioxide was consumed because of gas losses through the outgas bubbler and from releasing the pressure from the reactor at the completion of the reaction.

Approximately 0.5 g. of an antifoaming agent was added to the reaction mixture and the agitation rate was decreased. Water was removed from the reaction mixture by steam heating to 99°C. over a 3.5 hour period. A 2-phase overhead of 2,350 g. was collected. The overhead comprised a top thinner layer of 1,380 ml. and a bottom methanol/water layer of 1,620 ml.

The reactor contents were cooled to 82°C and 505 g. of water added. The reaction mixture was then heated to 115°C. in 1.5 hours. A 2-phase overhead weighing 2,070 g. was collected. The top thinner layer comprised 2,100 ml. and the bottom aqueous layer 550 ml. The reactor contents were cooled to 38°C. and 703 g. of high flow filter aid was added to the reactor contents. The contents were then filtered through an FT2 Sperry filter press to remove the bulk of the sediment. The filtration was very rapid taking less than 5 minutes to

TABLE II

| Run No. | Reactants, Parts by Weight | | | | | | | | | Rxn Temp °C | | Product | | |
|---|---|---|---|---|---|---|---|---|---|---|---|---|---|---|
| | Mg Sulfonate | MgO | Diluents | $H_2O$ | $CH_3OH$ | Naphthenic Acids | 126N Oil | $CO_2$ | | Initial | Final | Wt | Av | Base Ratio |
| A | 110 (1) | 26 | 200 | 17 | 27 | 0 | 30 | 9 | | 38 | 51 | 145 | 149 | 5 |
| B | do. (1) | do. | do. | do. | do. | 5 | 25 | 14 | | do. | 60 | 165 | 263 | 8 |
| C | do. (1) | do. | do. | do. | do. | 10 | 20 | 14 | | do. | 61 | 167 | 285 | 9 |
| D | do. (1) | do. | do. | do. | do. | 20 | 10 | 14 | | do. | 61 | 166 | 304 | 10 |
| E | do. (1) | do. | do. | do. | do. | 30 | — | 15 | | do. | 62 | 170 | 306 | 10 |
| F | 120 (2) | do. | do. (3) | do. | do. | 20 | — | 14 | | do. | 57 | 162 | 290 | 9 |
| G | do. (4) | 39 | 400 | 30 | do. | do. | — | 24 | | do. | 60 | 183 | 402 | 14 |
| H | do. (2) | do. | do. | do. | do. | do. | — | 25 | | 10 | 51 | 183 | 407 | 14 |
| I | do.(2)(5) | do. | do. | do. | do. | do. | — | 21 | | 23 | 24 (6) | 185 | 404 | 14 |

1 Mg as sulfonate = 1.07%w.
2 Mg as sulfonate = 1.00%w.
3 Xylene instead of thinner.
4 Neutral calcium sulfoante, Ca as sulfonate = 1.64%w.
5 Sulfonate derived from 100% synthetic heavy alkylate.
6 Maintained isothermal by external cooling.

Example 3

A larger quantity of a basic magnesium salt is prepared by adding the following materials in the indicated amounts to a 10-gallon reactor. Neutral magnesium sulfonate, 6,000 g.; magnesium oxide (Michigan 3), 1,365 g.; Gulf Coast naphthenic acids, 1,050 g.; methanol, 1,420 g.; Chevron 265 thinner, 10,500 g.; and water, 890 g.

The above mixture was heated to approximately complete the pass through of the entire reactor contents. The press was then washed by circulating thinner several times. The filter press was then cleaned and the combined filtrate and wash thinner was refiltered using 1,400 g. of filter aid. Rapid filtration was again observed. The press was washed with thinner. The combined filtrate and washings were heated in the reactor to 205°C. to remove the thinner. A final stripping was undertaken at 210°C. at a pressure of 1 lb. per square inch absolute to yield a product weighing 7,977 g. The product had the following properties:
Alkalinity Value, mg KOH, g 327
Viscosity, SUS at 210°F. 1,382
Magnesium Metal, percent weight 7.83
Magnesium as sulfonate, percent weight 0.78
Sediment, percent Volume 0.08
Specific Gravity, 60/60°F. 1.1040

Example 4

The following crankcase oil for use in an internal combustion engine was formulated:

Viscosity Improver - A commercially available alkyl methacrylate/vinyl pyrrolidone copolymer containing 0.2 percent nitrogen, 6.8 percent weight.

An alkyl succinimide derived by reacting a polyisobutene (number average molecular weight about 950) substituted succinic anhydride with tetraethylene pentamine; mol ratio of amine to anhydride = 0.87, 3 percent weight.

Basic magnesium salt from Example 3 - 40 millimole/kilogram.

Carbonated, sulfurized calcium polypropylene phenate (9.2 percent calcium), 30 millimoles/kilogram.

Zinc bis(polypropylene phenyl) dithiophosphate (2.85% phosphorus), 7 millimoles/kilogram.

Zinc di (isobutyl) mixed primary hexyl dithiophosphate (8.5 percent phosphorus), 11 millimoles/kilogram.

Base oil (viscosity 10 W-30) to make 100 percent.

This oil was then used in the varish engine test designated ASTM-VC. In this test four quarts of the test oil are used as a crankcase lubricant in a 302 cubic as displacement V-8 engine. The engine is cycled through an idle and cold and hot power output cycles for 192 hours. The results obtained for the above oil formulation as well as the passing requirements for an SE grade oil are shown in Table IV below.

TABLE IV

SEQUENCE VC ENGINE TESTS

|  | Passing Requirements For SE Grade Oil | Test Oil Rating |
|---|---|---|
| Average Engine Sludge | 8.5 Minimum | 8.5 |
| Average Piston Skirt Varnish | 8.2 Minimum | 8.8 |
| Average Engine Varnish | 8.0 Minimum | 8.4 |
| Oil Screen Clogging, Percent | 5 Maximum | 0 |
| Oil Ring Clogging, Percent | 5 Maximum | 0 |
| Compression Ring Stuck | None | None |
| Compression Oil Ring Stuck | None | None |
| Overall Result | — | Pass |

Example 5

Four oils were formuled as shown below in Table V(A):

TABLE V(A)

OIL FORMULATIONS

| COMPONENT | OIL A | OIL B | OIL C | OIL D |
|---|---|---|---|---|
| Basic Alkaline Metal Sulfonate | 40 mm[1,2] | 40 mm[3] | 40 mm[4] | 40 mm[5] |
| Alkenyl Succinimide,[6] % w | 4 | 4 | 4 | 4 |
| Calcium Propylenephenate[6] | 30 mm | 30 mm | 30 mm | 30 mm |
| Zn Dithiophosphate, 2.85% P[6] | 6 mm | 6 mm | 6 mm | 7 mm |
| Zn Dithiophosphate, 8.5% P[6] | 9 mm | 9 mm | 9 mm | 11 mm |

[1]mm = millimoles of metal ion per kilogram of oil
[2]Basic magnesium sulfonate as prepared in Example 3
[3]Commercially available basic magnesium sulfonate having AV = 4
[4]Same as 3, AV = 400
[5]Commercially available basic calcium sulfonate detergent having AV = 290
[6]See Example 4 for full description The above oils were used as the crankcase lubricant in a caterpillar diesel engine operated at 1,800 rpm with a brake horsepower output of 42. The test was continued for 180 hours at which time the engine was disassembled and rated for deposits. The results are shown below in Table V(B).

The following rating system was used. The grooves were rated on a scale of from 0 to 100 with 0 being clean. The lands were rated on a scale of from 0 to 800 with 0 being clean. The underhead was rated on a scale of from 0 to 10 with 10 being clean.

TABLE V(B)

DIESEL ENGINE PERFORMANCE TESTS

| OIL NO. | GROOVES | LANDS | UNDERHEAD | MINIMUM SIDE RING CLEARANCE MILS |
|---|---|---|---|---|
| A | 34-3-0.7-0.5 | 75-30-75 | 5.3 | 5 |
| B | 68-3-0.8-0.7 | 55-50-50 | 4.6 | 1.5 |
|   | 66-1.3-0.7-0.7 | 65-55-75 | 5.2 | 2.0 |
| C | 32-4-0.5-0.5 | 115-70-85 | 5.8 | 1.5 |
| D | 59-0.8-0.6-0.5 | 130-25-60 | 4.2 | 2.0 |

As can be seen from the above data, the lubricating oil composition of the invention (Oil A) maintained the engine in a state of cleanliness at least equal to that obtainable with commercially available basic alkaline metal sulfonates.

I claim:

1. The process for preparing oil-soluble basic magnesium salts having a metal ratio of from 5 to 25 comprising contacting, at a temperature from about 10°C to about the decomposition temperature of the reaction mixture, at least one acidic material selected from the group consisting of $B_2O_3$, $CO_2$, $H_2S$, $SO_2$, HCl, $NO_2$, $PCl_3$, $ClO_2$, $SOCl_2$, $BF_3$, $CS_2$, COS, formic acid, oxalic acid, acetic acid, and propionic acid, with a mixture comprising:
   1. At least one oil-soluble sulfonic acid or salt thereof susceptible to overbasing;
   2. From 5 to 25 equivalents of a basically reacting magnesium oxide per equivalent of said oil-soluble sulfonic acid and salts thereof;
   3. Water in an amount from about 0.5 mols to about 10 mols per mol of said magnesium oxide;
   4. At least one lower alkanol containing one to six carbon atoms in an amount from about 0.1 mols to about 10 mols per mol of said magnesium oxide;
   5. Naphthenic acids havinan average molecular weight from about 150 to about 600 in an amount from about 0.1 equivalents to about 5.0 equivalents per equivalent of said sulfonic acid and salts thereof; and
   6. At least one substantially inert organic liquid diluent comprising from about 25 to about 80% by weight of said mixture;

until reaction between the said acidic material and said mixture substantially ceases.

2. The process of claim 1 wherein said acidic material is carbon dioxide and said salts of said oil-soluble sulfonic acids are selected from the group consisting of Group II metal salts thereof.

3. The process of claim 2 wherein the Group II metals of said Group II metal salts are selected from the group consisting of magnesium, calcium and barium.

4. The process of claim 3 wherein said Group II metal is magnesium.

5. The process of claim 4 wherein said lower aliphatic alcohol contains from 1 to 4 carbon atoms and the water-alcohol molar ratio is from about 0.5:1 to about 5:1.

6. A lubricating oil composition comprising a major amount of an oil of lubricating viscosity and a detergent amount of a composition prepared according to claim 1.

7. A lubricating oil composition comprising a major amount of an oil of lubricating viscosity and a detergent amount of a composition according to claim 2.

8. A lubricating oil composition comprising a major amount of an oil of lubricating viscosity and a detergent amount of a composition according to claim 3.

9. A lubricating oil composition comprising a major amount of an oil of lubricating viscosity and a detergent amount of a composition according to claim 4.

10. A lubricating oil composition comprising a major amount of an oil of lubricating viscosity and a detergent amount of a composition according to claim 5.

11. The process of claim 5 wherein the temperature of said mixture is maintained between about 10°C and 100°C.

12. A lubricating oil composition comprising a major amount of an oil of lubricating viscosity and a detergent amount of a composition according to claim 11.

* * * * *

UNITED STATES PATENT OFFICE
CERTIFICATE OF CORRECTION

Patent No. 3,853,774     Dated December 10, 1974

Inventor(s) Richard E. Crocker

It is certified that error appears in the above-identified patent and that said Letters Patent are hereby corrected as shown below:

Col. 8, line 34, "filter acid" should read --filter aid--

Col. 14, Table V(A), Footnote 3, "having AV=4" should read --having AV=300--

Col. 15, Table V(B), under "Grooves" Oil No. C "32-4-0.5-0.5" should read --31-4-0.5-0.5--

Col. 15, line 39, "havinan" should read --having--.

Signed and sealed this 15th day of April 1975.

(SEAL)
Attest:

RUTH C. MASON
Attesting Officer

C. MARSHALL DANN
Commissioner of Patents
and Trademarks